United States Patent [19]
Itoi

[11] Patent Number: 5,510,904
[45] Date of Patent: Apr. 23, 1996

[54] VIDEO DATA COMPRESSOR MINIMIZING PROPAGATION OF ERROR

[75] Inventor: Satoshi Itoi, Tokyo, Japan

[73] Assignee: NEC Corporation, Japan

[21] Appl. No.: 200,754

[22] Filed: Feb. 23, 1994

[30] Foreign Application Priority Data

Feb. 23, 1993 [JP] Japan .................................. 5-33496

[51] Int. Cl.[6] .............. H04N 5/78; H04N 5/945; H04N 7/30
[52] U.S. Cl. .............. 358/336; 348/403; 348/420
[58] Field of Search .................... 358/335, 336; 348/409, 420, 403; H04N 7/133, 5/78, 5/945, 7/30

[56] References Cited

U.S. PATENT DOCUMENTS

| 5,175,631 | 12/1992 | Juri ........................................... 358/335 |
| 5,301,018 | 4/1994 | Smidth ..................................... 348/409 |

FOREIGN PATENT DOCUMENTS

| 0471118 | 8/1990 | European Pat. Off. . |
| 0467717 | 7/1991 | European Pat. Off. . |
| 0499303 | 1/1992 | European Pat. Off. . |
| 0509594 | 4/1992 | European Pat. Off. . |
| 0523708 | 7/1992 | European Pat. Off. . |
| 0527611 | 8/1992 | European Pat. Off. . |
| 0556063 | 2/1993 | European Pat. Off. . |
| 0559467 | 3/1993 | European Pat. Off. . |
| 61-123280 | 6/1986 | Japan . |
| 61-181286 | 8/1986 | Japan . |
| 62-199179 | 9/1987 | Japan . |
| 63-308474 | 12/1988 | Japan . |

OTHER PUBLICATIONS

Sandbank, C., *Digital Television*, "Recording of Digital Video Signals", John Wiley & Sons, 1990, Chichester, G.B., pp. 442–449.

Yamamitsu, C., *IEEE Transactions on Consumer Electronics*, "A Study on Trick Plays for Digital VCR", vol. 37, No. 3, Aug., 1991, New York, NY, pp. 261–266.

*Primary Examiner*—Howard W. Britton
*Attorney, Agent, or Firm*—Ostrolenk, Faber, Gerb & Soffen

[57] ABSTRACT

Video data is compressed according to a bit rate to be subdivided into data blocks each having a predetermined number of bits. The blocks are sent to a shuffling circuit to undergo a shuffling predetermined for the circuit. To concentrate errors onto a portion of the shuffled video data, the data is delivered to an inverse shuffled circuit to be subjected to an inverse shuffling so as to restore the data undergone a shuffling predetermined for a recording or transmitting apparatus, thereby transmitting the resultant compressed data to a D-2 VTR. This possibly reduces the interpolation probability on the screen and disperses the data. Even at occurrence of a burst error exceeding a correction capacity, propagation of the error can be minimized.

17 Claims, 8 Drawing Sheets

FIG. 3

|  | 0<br>01—84 | 1<br>01—84 | 2<br>01—84 | 3<br>01—84 | 4<br>01—84 | 5<br>01—84 | FST |
|---|---|---|---|---|---|---|---|
| r0–127 | | S→B | | | | | 000 |
| 128–255 | | | | | | | 001 |
| 256–383 | | | | | | | 010 |
| 384–511 | | | | | | | 011 |
| 512–639 | | | | | | | 020 |
| 640–767 | | | | | | | 021 |
| | | | | | | | 100 |
| | | | | | | | 101 |
| | | | | | | | 110 |
| | | | | | | | 111 |
| | | | | | | | 120 |
| | | | | | | | 121 |

| | |
|---|---|
| | F=1 S=2 T=1 |
| | F=1 S=2 T=0 |
| | F=1 S=1 T=1 |
| | F=1 S=1 T=0 |
| | F=1 S=0 T=1 |
| | F=1 S=0 T=0 |
| | F=0 S=2 T=1 |
| | F=0 S=2 T=0 |
| | F=0 S=1 T=1 |
| | F=0 S=1 T=0 |
| | F=0 S=0 T=1 |
| | F=0 S=0 T=0 |

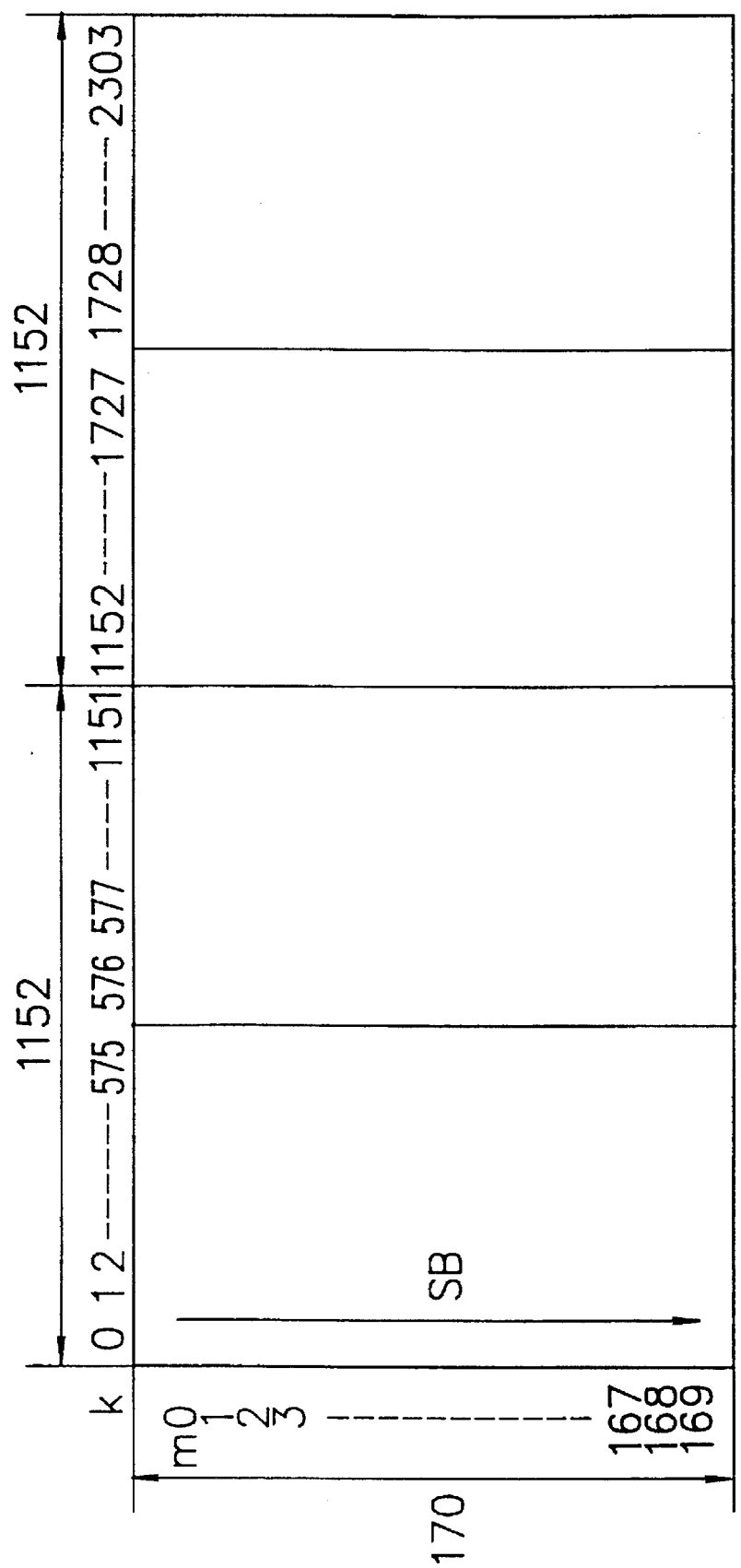

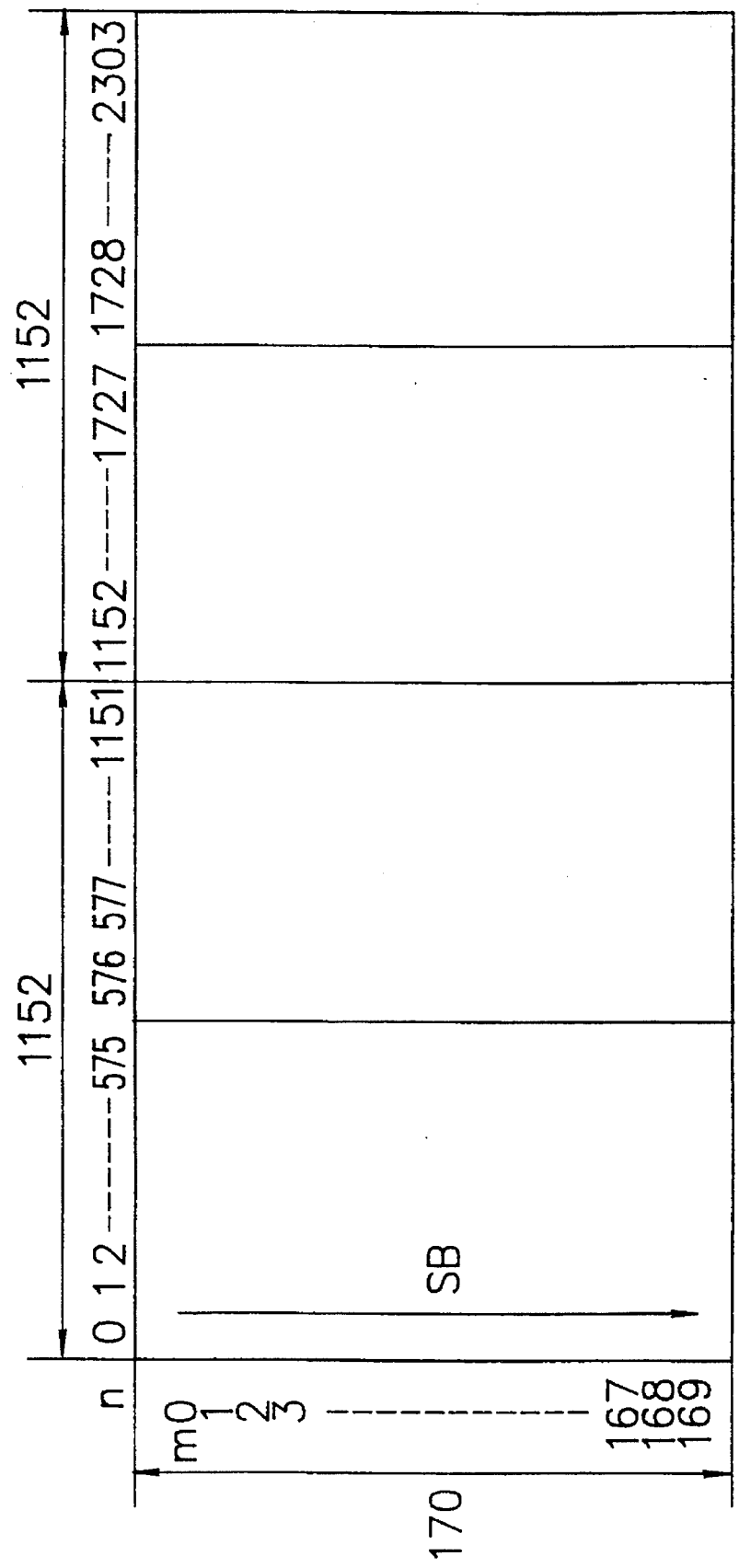

VIDEO DATA COMPRESSOR MINIMIZING PROPAGATION OF ERROR

BACKGROUND OF THE INVENTION

The present invention relates to a video data compressor for compressing video data, and in particular, to a video data compressor connectible to a recording apparatus such as a digital video tape recorder or an optical disk for recording thereon digital video data or a transmitting apparatus.

DESCRIPTION OF THE RELATED ART

Heretofore, there has been known a video data compressing apparatus to be connected to a digital video tape recorder (VTR) or a digital image recording optical disk for compressing video data. In such an apparatus, a two-dimensional (2D) discrete cosine transform (DCT) is conducted to achieve data compression for video blocks each including 8 pixels×8 lines. The transform has been described, for example, in the Japanese Patent Laid-Open Publication No. 63-308474. Data undergone the transform is then subjected to processing steps such as a zigzag scan, a quantization, and a variable-length coding. These operations are controlled so that a predetermined number of bits are contained in each field or frame. The data compressing method has been described, for example, in an article entitled "Outline and Trend of Standardization of MPEG" (Monthly Interface, August 1992) and the Japanese Patent Laid-Open Publication No. 61-123280.

In a video data compressor, the video data is thus compressed to be thereafter treated in the unit of 8-bit data for serial-to-parallel conversion. The data obtained as a result is transmitted to an apparatus such as a video tape recorder, an optical disk, or a data transmitting facility. In the apparatus, the compressed video data is shuffled to additionally produce error correction codes as described, for example, in the Japanese Patent Laid-Open Publication No. 62-199179. The resultant data is then combined with data such as audio data or system data. Thereafter, the data is subjected to a coding for recording thereof, an operation to produce a signal block therefrom, a channel separation for transmission thereof, an amplification by a recording amplifier, and the like. Finally, the data is recorded on a medium or transmitted to an external device.

In this regard, in a stage of reproducing recorded data or in a transmission stage of data, there may possibly occur a burst error exceeding an error correcting capacity of the system. In the prior art, the burst error is dispersed in a broad range by a shuffling circuit predetermined for the recorder or transmitter. This provision is arranged to possibly enhance capacity of the error interpolation circuit integrated in the apparatus such as the video tape recorder. In an apparatus in which recording or transmission of data is accomplished in the unit of pixels and there is conducted the operation to disperse the error, it is possible to cope with the error, for example, to conduct interpolation for the error according to peripheral pixels of the erroneous pixels. However, for the compressed video data this scheme is attended with a problem as follows.

For example, assume that an incorrigible error occurs in an operation to process data formed in the video block unit as above. In such a situation, naturally, data following the pertinent video block cannot be identified. Moreover, due to characteristics of variable-length codes, it is impossible to determine a demarcation point between the erroneous block and a video block subsequent thereto. Consequently, the error is also propagated to the subsequent video block. As a result, the error is sequentially passed to the following blocks in this way.

Ordinarily, to prevent this disadvantageous event, the compressed data is subdivided into data items each having an appropriate length, thereby producing a sync block. With this provision, the error is prevented from being propagated to a block beyond the block in which the error has occurred. However, in the pertinent block, a one-bit error thereof is propagated to the bits subsequent to the wrong bit. In this case, when the burst error is dispersed to a wider range by a shuffling circuit predetermined for the recording or transmitting apparatus as described above, all sync blocks in the range to which the error is dispersed are regarded to be erroneous. This leads to a problem of an extreme increase in the interpolation probability on the screen.

To overcome this problem, there has been proposed, for example, in the Japanese Patent Laid-Open Publication No. 61-181286 in which a high-frequency component of a video signal is subjected to a frequency shift to thereby produce a low-frequency signal. Thereafter, a frequency interleaving is conducted for the attained signal to multiplex the high-frequency component undergone the frequency shift, thereby recording the signal in the form of digital values.

However, the proposal has not intention of coping with, for example, the compressing method in which a DCT, a zigzag scan, a quantization, and a coding are conducted. Namely, there has not been described any means to prevent the error propagation.

SUMMARY OF THE INVENTION

It is therefore an object of the present invention to provide a video data compressor in which even when a burst error occurred in a recording or transmitting apparatus exceeds the error correcting capacity of the apparatus, propagation of the error can be minimized to the maximum extent.

In accordance with the present invention, the video data compressor includes compressing means for compressing video data according to a predetermined bit rate and inverse shuffling means for restoring data shuffled by a shuffling operation predetermined for a recording or transmitting apparatus, thereby concentrating errors in the apparatus onto a portion of the video data undergone the compression.

Namely, in accordance with the present invention, the data undergone the shuffling operation predetermined for the recording or transmitting apparatus is beforehand restored by the inverse shuffling operation and thereafter dispersed data is sent to the apparatus, thereby possibly lowering the interpolation probability on the screen.

Furthermore, in accordance with the present invention, the video data compressor includes compressing means for compressing video data according to a predetermined bit rate, subdividing means for subdividing the data compressed by the compressing means into data items each having a predetermined number of bits and thereby producing data blocks, shuffling means for shuffling the data blocks predetermined for the compressor, and inverse shuffling means for restoring the data shuffled by a shuffling operation determined for a recording or transmitting apparatus, thereby concentrating errors in the apparatus onto a portion of the compressed video data undergone the shuffling.

That is, in accordance with the present invention, each of the data blocks obtained by subdividing the video data is subjected to a shuffling operation predetermined for the compressor. To concentrate errors in the apparatus onto a portion of the compressed video data undergone the shuffling, the data undergone the shuffling operation predetermined for the recording or transmitting apparatus is beforehand restored by the inverse shuffling operation. Thereafter, the data is sent to the apparatus, thereby possibly lowering the interpolation probability on the screen and dispersing the data.

Moreover, in accordance with the present invention, there are conducted in a final stage of a data recording operation a shuffling operation predetermined for the compressor and an inverse shuffling operation to restore data undergone a shuffling operation predetermined for the recording or transmitting apparatus, thereby outputting the obtained data to a video tape recorder.

BRIEF DESCRIPTION OF THE DRAWINGS

The objects and features of the present invention will become more apparent from the consideration of the following detailed description taken in conjunction with the accompanying drawings wherein:

FIG. 3 is a diagram of a record data map of the recorder of FIG. 1;

FIG. 4 is an explanatory diagram of a track pattern of the recorder of FIG. 1;

FIG. 7 is a diagram of a shuffling layout map of high-vision data in the second embodiment: and FIG. 8 is an explanatory diagram useful to explain a shuffling projection map of high-vision data in the second embodiment.

DESCRIPTION OF THE PREFERRED EMBODIMENTS

Figure 1:
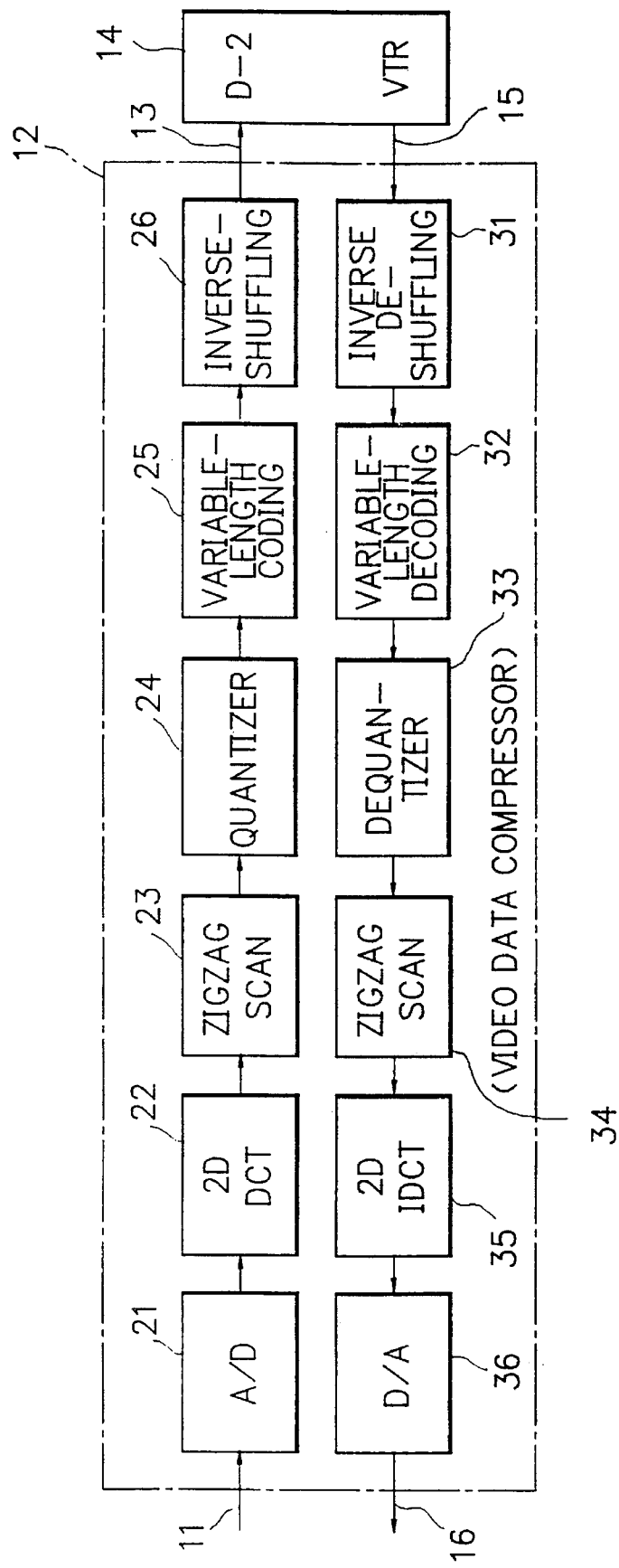
FIG. 1 is a schematic block diagram in which a video data compressor in a first embodiment in accordance with the present invention is connected to a D-2 VTR.

FIG. 1 shows a state in which a first embodiment of the present invention is connected to a D-2 VTR. In this connection, the D-2 VTR is a composite digital VTR conforming to the international standards of the national television standard committee (NTSC) or the phase alteration line (PAL) system. In the embodiment, video data 11 which is high-vision data including high-definition video signals is fed to a video data compressor 12 to obtain compressed data 13. The data 13 is sent to a D-2 VTR 14 to be recorded on a recording medium. In a playback operation, on the other hand, compressed data 15 outputted from the recorder 14 is fed to the compressor 12 so as to create expanded data, thereby obtaining video data 16 including analog signals.

The video data 11 in the form of analog signals including a luminance signal and a color difference signal is delivered to an analog-to-digital (A/D) converter 21 in the compressor 12 to be transformed into digital signals. The signals are supplied to a two-dimensional (2D) discrete cosine transform (DCT) circuit 22. In the circuit 22, the digital signals are subjected to the two-dimensional discrete cosine transform operation. The resultant signals are then inputted to a zigzag scan circuit 23 to undergo a zigzag scan and are thereafter inputted to a quantizing circuit 24 to be subjected to a quantization. The obtained signals are fed to a variable-length coding circuit 25 to produce variable-length codes. The codes are delivered to an inverse shuffling circuit 26 to undergo an inverse shuffling operation, thereby restoring the compressed data 13.

On the other hand, in a playback operation, the compressed data 16 supplied from the VTR 14 to an inverse deshuffling circuit 31. The signal undergone the inverse deshuffling is inputted to a variable-length decoding circuit 32 to undergo a decoding operation. The resultant data is fed to a de-quantizing circuit 33 so as to attain dequantizaed data. The data is delivered to a zigzag scan circuit 34 and is then inputted to a two-dimensional inverse discrete cosine transform (IDCT) circuit 35 to be subjected to an inverse discrete cosine transform operation. The inversely transformed data is thereafter fed to a digital-to-analog (D/A) converter circuit 86, thereby creating video data 16 in the form of analog signals.

As for operation of the compressor 12, description will be specifically given of an operation process of compressing the video data 11.

Figure 2:
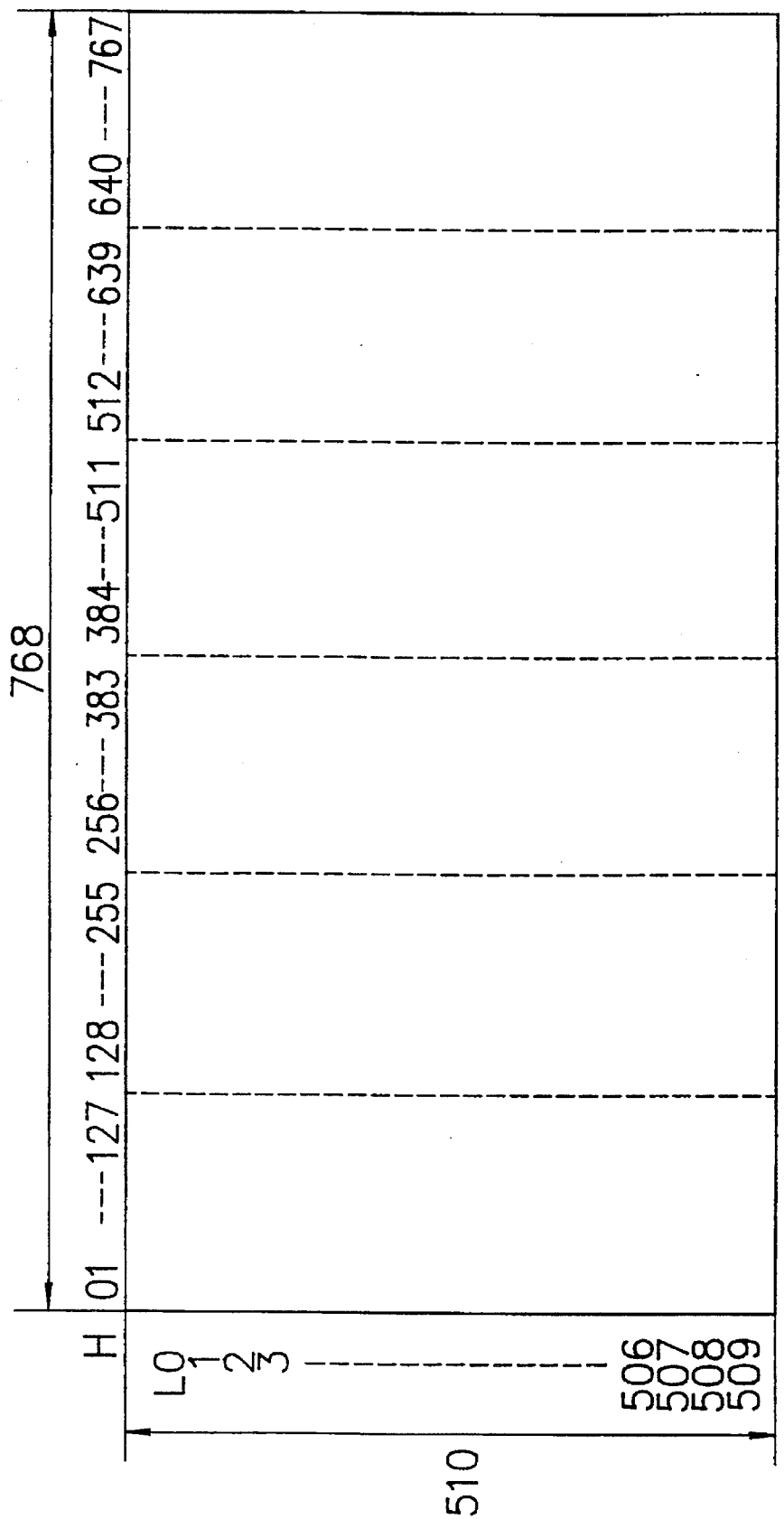
FIG. 2 is an explanatory diagram of an input data map of the recorder of FIG. 1.

FIGS. 2 to 4 show shuffling formats predetermined for a D-2 VTR recording or transmitting apparatus. FIG. 2 shows a one-frame screen. In the vertical direction, there are shown effective lines L (510 lines in total) of each frame; whereas, in the horizontal direction, there are presented effective samples H (768 samples in total) of each line. Assuming that "ih" is Int(H/2), the effective line L, effective sample H, and ih take the following values.

$L = 0, 1, 2 \ldots 509$ $H = 0, 1, 2 \ldots 767$ $ih = 0, 1, 2 \ldots 888$

FIG. 3 shows a projected image the map of FIG. 2 in which letters p, q, and r take the following values.

$p = 0, 1, 2 \ldots 84$ $q = 0, 1, 2 \ldots 5$ $r = 0, 1, 2 \ldots 767$

Under the conditions, the effective line L, effective sample H, and ih can be expressed as follows.

$$L = p + 85 \cdot \mathrm{Int}(r/128) \ ih = [12 \cdot p + 277 \cdot q + 258 \cdot (r \bmod 64)] \bmod 384 \ H = 2 \cdot ih + [L + \mathrm{Int}(r/64)] \bmod 2 \quad (1)$$

FIG. 3 specifically shows relationships between a field F, a segment S, and a channel T, which respectively take the following values.
$F = 0, 1, S = 0, 2, T = 0, 1$ Consequently, these values can be expressed as follows.

$$F = \mathrm{Int}(r/384) \ S = [\mathrm{Int}(r/128)] \bmod 3 \ T = [\mathrm{Int}(r/64)] \bmod 2 \quad (2)$$

The recording operation is effected in an order as indicated by an arrow denoted as SB (sync block) in FIG. 3. The recording is horizontally conducted for each line from the upper-most line to the lower-most line, namely, for r=0, q=0, p=0 to 84 and r=0, q=0, p=0 to 84 with conditions of q=0 to 1, 2 to 3, and 4 to 5 and then with conditions of r=0 to 767. The recording order "X" (0≦X≦391679) is expressed as follows.

$$X = p + 85 \cdot q + 510 \cdot r \quad (3)$$

In this connection, in the actual format, there is employed another order exchange in the recording order of the code r. However, influence therefrom is ignorable and is hence not taken into consideration in this embodiment.

Figure 5:
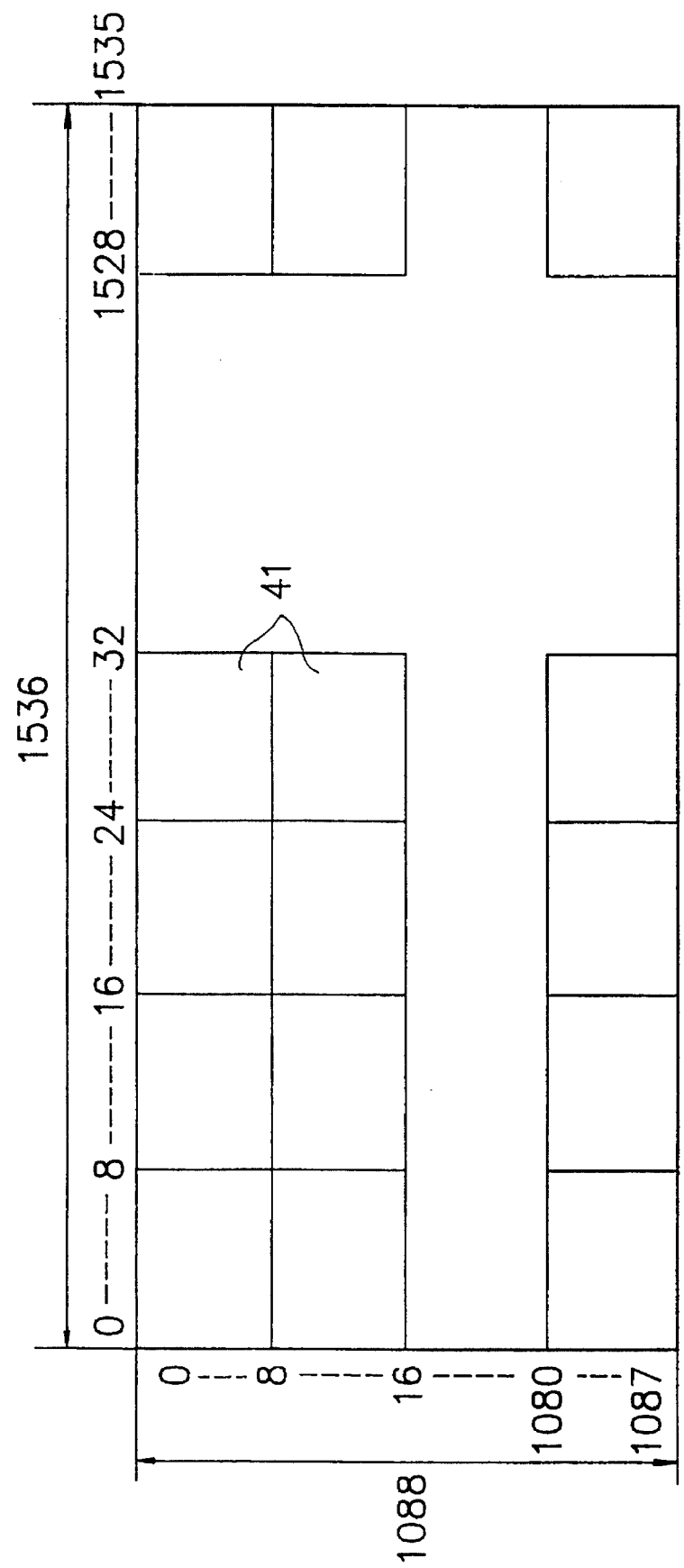
FIG. 5 is a diagram showing a video block map of high-vision data in the first embodiment.

FIG. 5 shows a video block map of high-vision data. As shown in the map, including the luminance and color signals, there are obtained 1088 lines×1536 samples for each frame. The block generating operation is conducted to produce video blocks each including 8 lines×8 samples. As a result, each frame includes 136×192=26112 video blocks.

In the compressor 12 of FIG. 1, the transform operation is first conducted for each video block 41; thereafter, a zigzag scan, a quantization, and a variable-length coding are effected for the obtained data. The control operation is resultantly accomplished to allocate an appropriate number of bits to each block such that the size of each frame does not exceed the number of bits (3133440 bits) predetermined for the D-2 VTR 14.

Subsequently, the video data is subjected to a serial-to-parallel conversion in the inverse shuffling circuit 26, thereby restoring the data undergone the shuffling described above. First, the compressed data after the conversion is sequentially arranged as shown in FIG. 3 according to the following order: r=0, q=0, p=0 to 84 and r=0, q=1, p=0 to 84 with conditions of q=0 to 1, 2 to 3, 4 to 5; moreover, r=0 to 767. Namely, the order X ($0 \leq X \leq 391679$) of the compressed data undergone the conversion is represented by the expression (3).

Next, the data of FIG. 3 is mapped as shown in FIG. 2 in which the effective line L, the effective sample H, ih, and symbols p, q, and r are as already described. Relationships between the values respectively of L, H, and ih are represented by the expression (1).

Finally, as the compressed data 13 from the compressor 12, there is produced data for H=0 to 767 with L =0. While incrementing the value of effective line L up to 509 by an increment of one, the data is sequentially created, thereby transmitting one frame of the compressed data 13 to the recorder 14. Namely, the output data order Y ($0 \leq X \leq 391679$) is expressed as follows.

$$Y = H + 768 \times L \qquad (4)$$

As a result, there is implemented an inverse shuffling to restore data undergone the shuffling predetermined for the recording or transmitting apparatus. In a video playback operation, data supplied from the recorder 14 to the compressor 12 is subjected to an inverse de-shuffling by the inverse de-shuffling circuit 31 in the first stage of operation.

Figure 6:
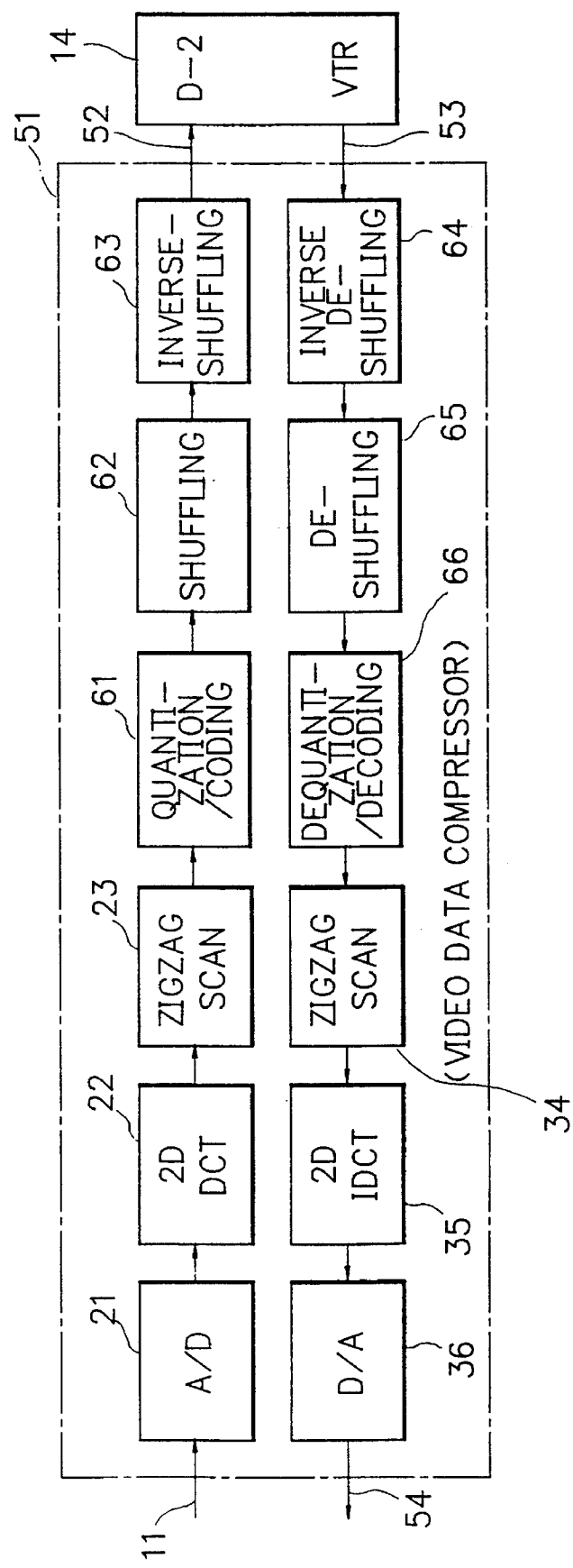
FIG. 6 is a diagram in which a video data compressor in a second embodiment in accordance with the present invention is connected to a D-2 VTR.

FIG. 6 shows a state in which a video data compressor in a second embodiment of the present invention is connected to a D-2 VTR. Also in the second embodiment, video data 11 in the form of high-vision data is fed to a video data compressor 51. The compressed data 52 is sent to a D-2 VTR 14 to be recorded therein. On the other hand, in a playback operation, compressed data 53 is delivered from the recorder 14 to the compressor 51 to be resultantly expanded, thereby outputting video data 54 including analog signals. In this diagram, the same components as those of FIG. 1 are assigned with the same reference numerals, and hence a redundant description thereof will be avoided.

In the compressor 51 of the embodiment, data outputted from a zigzag scan circuit 23 is delivered to a quantizing and coding circuit 61 to undergo a quantization and a coding operation. The resultant data is then inputted to a shuffling circuit 62 to be subjected to a shuffling predetermined for the compressor 51, thereby sending the obtained data to an inverse shuffling circuit 63. In the circuit 63, the data undergoes an inverse shuffling so as to restore the data shuffled by a shuffling operation predetermined for the recording or transmitting apparatus, thereby transmitting the resultant compressed data 52 to the recorder 14. Conversely, in a playback operation, the compressed data 53 is supplied from the recorder 14 to an inverse de-shuffling circuit 64 to undergo an inverse de-shuffling. The data is then de-shuffled by a de-shuffling circuit 65. The obtained data undergoes a de-quantization and a decoding operation in a de-quantizing and decoding circuit 66 and is then fed to a zigzag scan circuit 34. In this connection, the circuit 61 is implemented by combining the quantizing circuit 24 with the variable-length coding circuit 2 of the first embodiment; whereas, the circuit 66 includes the variable-length decoding circuit 32 and the de-quantizing circuit 33 of the first embodiment.

In regard to the circuit operation of the compressor 51, description will be specifically given of an operation process of compressing the video data 11. In the description, the drawings related to the first embodiment will be referenced when necessary.

As described in conjunction with FIG. 5, a frame of high-vision data including the luminance and color difference signals includes 1088×1536 samples. The data is partitioned into video blocks each including 8 lines×8 samples such that each frame contains 26112 video blocks as described above.

Also in the compressor 51 of the second embodiment, the two-dimensional discrete cosine transform is first accomplished for each video block 41. The data is then subjected to the zigzag scan, quantization, and variable-length coding so as to allocate an appropriate number of bits to each block. As a result, the control operation is effected such that the size of each frame is equal to or more than a number of bits (3133440 bits=391680 bytes) predetermined for the D-2 VTR 14. Subsequently, the video data is shuffled in the 8-bit unit by the shuffling circuit 62 so as to conduct a serial-to-parallel conversion thereof, thereby achieving a shuffling operation predetermined for the compressor 51.

FIG. 7 shows a data layout for the shuffling operation in which rows and arrays are respectively designated by letters m and k. The compressed data undergone the conversion is first arranged in an order of m=0 to 169.

Namely, in a direction denoted by an arrow "SB (sync block)" in a range of k=0 to 2303.

Next, with the row direction, namely, the value of m kept unchanged, the value of k denoting the column direction is shuffled so as to determine combinations of symbols m and n, thereby allocating rows and columns to the map. FIG. 8 shows a map including the rows and columns represented by symbols m and n, respectively. In FIGS. 7 and 8, the symbols m, k, and n take the following values.

m=0, 1, 2 . . . 169 k=0, 1, 2 . . . 2303 n=0, 1, 2 . . . 2303

Assume that the values of k and n are controlled so that the following relationships are satisfied.

$$k = 48 \cdot (n \bmod 48) + \text{Int}(n/48) \quad n = 48 \cdot (k \bmod 48) + \text{Int}(k/48) \qquad (5)$$

Assumed that the compressed data is sequentially arranged in an order of m=0 to 169 (in the direction of the arrow "SB") with n ranging from 0 to 2303.

Subsequently, the data is delivered to an inverse shuffling circuit 26 to be subjected to an inverse shuffling predetermined for the recording or transmitting apparatus. Data series attained by inversely shuffling the compressed data undergone the conversion are arranged as shown in FIG. 3 in an order as follows: r=0, q=0, p=0 to 84 and r=0, q=1, and p=0 to 84 with q=0 to 1, 2 to 3, and 4 to 5; moreover, r=0 to 767. That is, the order X ($0 \geq X \geq 391679$) of compressed data undergone the conversion is represented by the expression (3).

Next, the data thus arranged in FIG. 3 is mapped as shown in FIG. 2 in which the effective line L, the effective sample H, ih, and symbols p, q, and r are as already described above. Relationships between L, H, and ih are represented by the expression (1).

Finally, as the compressed data 13 from the compressor 12, there is produced data for H=0 to 767 with L =0. While incrementing by one the value of L up to 509, the compressed data 13 is outputted to the reader 14. As a result, one frame of compressed data 13 is transmitted to the recorder 14. Namely, the output data order Y ($0 \leq Y \leq 391679$) is represented by the expression (4). Through the operation described above, there is achieved an inverse shuffling to restore data shuffled by the shuffling operation predetermined for the recording or transmitting device.

On the recording side, in a stage near the end stage thereof, there are conducted a shuffling operation predetermined for the compressor and an inverse shuffling to restore data shuffled by a shuffling operation predetermined for the recorder or transmitter, thereby sending the resultant compressed data 52 to the recorder 14. In a video signal playback operation, data supplied from the recorder 14 to the compressor 51 is fed to the inverse de-shuffling circuit 64 in the first stage thereof to undergo an inverse de-shuffling. The obtained data is then de-shuffled by the de-shuffling circuit 65.

Incidentally, in the description of the first and second embodiments, the high-vision data is compressed to be recorded in the D-2 VTR. However, it is to be appreciated that the present invention is similarly applicable to other recording and transmitting facilities.

In accordance with the present invention as described above, video data is compressed according to a predetermined bit rate. To concentrate errors in a recording or transmitting apparatus onto a portion of the compressed video data, data shuffled by a shuffling operation predetermined for the apparatus is restored such that dispersed data is supplied to the apparatus, thereby possibly lowering the interpolation probability on the screen.

Furthermore, in accordance with the present invention as described above, video data is compressed according to a predetermined bit rate. The attained data thus compressed is subdivided into data blocks each having a predetermined bits. The data blocks are subjected to a shuffling predetermined for the compressor; moreover, to concentrate errors in a recording or transmitting apparatus onto a portion of the compressed video data undergone the shuffling, the data shuffled by a shuffling operation predetermined for the apparatus is restored such that the resultant data is sent to the apparatus, thereby possibly lowering the interpolation probability on the screen and dispersing the data.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A video data compressor for converting a set of video data into an adapted sequence of compressed data to be outputted to a video medium subjected to a data error correction process including a data shuffling process, said video data compressor comprising:

a data compressing means compressing said set of video data into a first sequence of compressed data with a predetermined bit rate; and an inverse shuffling means shuffling said first sequence of compressed data in an inverse manner to said data shuffling process to obtain said adapted sequence of compressed data, so that an arbitrary pair of neighboring data in said first sequence of compressed data are neighbors to each other in said data error correction process.

2. A video data compressor as claimed in claim 1, wherein said inverse shuffling means comprises:

a dividing means dividing said first sequence of compressed data into a number of ordered subsequences thereof, with each composed of a predetermined number of bits; and a shuffling means shuffling said number of ordered subsequences to obtain said adapted sequence of compressed data.

3. A video data compressor as claimed in claim 1, wherein said inverse shuffling means is an inverse shuffling circuit.

4. A video data compressor as claimed in claim 1, wherein said data compressing means comprises a two-dimension discrete cosine transform circuit outputted to a zigzag scan circuit, with said zigzag scan circuit outputted to a quantizer circuit, and with said quantizer circuit outputted to a variable-length coding circuit.

5. A video data compressor as claimed in claim 1, further comprising:

an inverse de-shuffling means shuffling an input sequence of compressed data from said video medium in a manner to decrypt said shuffling by said inverse shuffling means.

6. A video data compressor as claimed in claim 5, wherein said inverse de-shuffling means is an inverse de-shuffling circuit.

7. A video data compressor as claimed in claim 1, wherein said data compressing means comprises:

a compression means compressing said set of video data into a second sequence of compressed data with said predetermined bit rate; and a shuffling means shuffling said second sequence of compressed data to obtain said first sequence of compressed data.

8. A video data compressor as claimed in claim 7, wherein said compression means is a two dimension discrete cosine transform circuit outputted to a zigzag scan circuit, with said zigzag scan circuit outputted to a quantizing and coding circuit.

9. A video data compressor as claimed in claim 7, wherein said shuffling means is a shuffling circuit.

10. A video data compressor for converting a set of video data into an adapted sequence of compressed data to be outputted to a video medium subjected to a data error correction process including a data shuffling process, said video data compressor comprising:

a data compressing means compressing said set of video data into a first sequence of compressed data with a predetermined bit rate:

subdividing means subdividing said set of video data compressed by the compressing means into data blocks each having a predetermined number of bits; and an inverse shuffling means shuffling said first sequence of compressed data in an inverse manner to said data shuffling process to obtain said adapted sequence of compressed data, so that an arbitrary pair of neighboring data in said first sequence of compressed data are neighbors to each other in said data error correction process.

11. A compressor as claimed in claim 10, wherein there are effected in a final stage on a recording side a shuffling operation predetermined for the compressor and an inverse shuffling for restoring data shuffled by a shuffling operation predetermined for a recording or transmitting apparatus, thereby outputting resultant data to a video tape recorder.

12. A compressor as claimed in claim 10, wherein the predetermined number of bits is 3133440 bits or less.

13. A compressor as claimed in claim 10, wherein the shuffling means shuffles the video data of the data blocks per 8 bits.

14. A compressor as claimed in claim 10, wherein the compressing means includes a two-dimensional discrete cosine transform circuit.

15. A compressor as claimed in claim 10, wherein the compressing means includes a zigzag scan circuit.

16. A compressor as claimed in claim 10, wherein the compressing means includes a quantizing circuit.

17. A compressor as claimed in claim 10, wherein the compressing means includes a variable-length coding circuit.

* * * * *